United States Patent
Crevier et al.

(10) Patent No.: US 9,418,356 B2
(45) Date of Patent: Aug. 16, 2016

(54) STREAMLINED COLLABORATION ON DOCUMENT

(75) Inventors: Daniel W. Crevier, Bellevue, WA (US); Jason F. Moore, Redmond, WA (US); David Citron, Redmond, WA (US); Jennifer I. Shen, Mountain View, CA (US); Gareth A. Howell, Bothell, WA (US); Jonathan A. Bockelman, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1053 days.

(21) Appl. No.: 12/775,614

(22) Filed: May 7, 2010

(65) Prior Publication Data

US 2011/0276897 A1 Nov. 10, 2011

(51) Int. Cl.
*G06Q 10/10* (2012.01)
*G06F 17/30* (2006.01)
*H04L 12/58* (2006.01)

(52) U.S. Cl.
CPC ........ *G06Q 10/107* (2013.01); *G06F 17/30165* (2013.01); *H04L 51/08* (2013.01)

(58) Field of Classification Search
CPC . G06Q 10/107; G06Q 10/10; G06F 17/30165
USPC ........................................................ 715/752
See application file for complete search history.

(56) References Cited

U.S. PATENT DOCUMENTS

| | | | | |
|---|---|---|---|---|
| 5,515,491 A * | 5/1996 | Bates et al. | | 715/754 |
| 5,802,530 A * | 9/1998 | Van Hoff | | 715/207 |
| 6,182,273 B1 | 1/2001 | Tarumi | | |
| 6,662,212 B1 | 12/2003 | Chandhok et al. | | |
| 7,062,532 B1 * | 6/2006 | Sweat et al. | | 709/205 |
| 7,117,210 B2 | 10/2006 | DeSalvo | | |
| 7,243,298 B2 | 7/2007 | Yozell-Epstein et al. | | |
| 7,277,901 B2 * | 10/2007 | Parker et al. | | |
| 7,369,260 B2 * | 5/2008 | Buschi et al. | | 358/1.15 |
| 7,376,702 B2 | 5/2008 | DeSalvo et al. | | |
| 7,818,678 B2 * | 10/2010 | Massand | | 715/751 |
| 2002/0143691 A1 * | 10/2002 | Ramaley et al. | | 705/37 |

(Continued)

FOREIGN PATENT DOCUMENTS

| | | | |
|---|---|---|---|
| CN | 1755680 A | 4/2006 | |
| EP | 1569147 A1 * | 8/2005 | .............. G06F 17/60 |

OTHER PUBLICATIONS

Author: Google Title: Google Announces Google Docs & Spreadsheets Date: Oct. 11, 2006 Publisher: Google pp. 1-2.*
Author: Evan Wondrasek Title: How to: Create, Edit, and Share Documents Online With Google Docs Date: Jun. 3, 2009 pp. 1-3.*
Author: Ed Bott, Woody Leohard Title: Special Edition Using Microsoft Office 2003 Publisher: Pearson Education Date: Feb. 1, 2006 Pertinent pp. 322.*

(Continued)

*Primary Examiner* — Ajay Bhatia
*Assistant Examiner* — Phoebe Pan
(74) *Attorney, Agent, or Firm* — Judy Yee; Bryan Webster; Micky Minhas

(57) ABSTRACT

Collaborating on documents by e-mail may be streamlined into a unified process. In one example, a user creates a document in an online document service, and sends the document to collaborators by mailing a link to the document. The document may have permissions set so that the creator of the document, and any user on the e-mail distribution list, can read and edit the document. When a user receives the e-mail, that user may open and edit the document. Upon closing the editing application, the user may be presented with an appropriate interface to create a reply e-mail.

20 Claims, 6 Drawing Sheets

(56) References Cited

U.S. PATENT DOCUMENTS

| | | | |
|---|---|---|---|
| 2002/0174010 A1* | 11/2002 | Rice, III | 705/14 |
| 2004/0172450 A1 | 9/2004 | Edelstein et al. | |
| 2005/0120072 A1 | 6/2005 | Miyazaki et al. | |
| 2005/0187937 A1* | 8/2005 | Kawabe et al. | 707/9 |
| 2005/0198578 A1 | 9/2005 | Agrawala et al. | |
| 2006/0123347 A1* | 6/2006 | Hewitt et al. | 715/748 |
| 2006/0242632 A1* | 10/2006 | Orsolini et al. | 717/140 |
| 2006/0259524 A1* | 11/2006 | Horton | G06F 17/24 |
| 2007/0005715 A1 | 1/2007 | LeVasseur et al. | |
| 2007/0130143 A1* | 6/2007 | Zhang et al. | 707/8 |
| 2007/0143425 A1 | 6/2007 | Kieselbach et al. | |
| 2007/0192155 A1 | 8/2007 | Gauger | |
| 2007/0192156 A1* | 8/2007 | Gauger | 705/8 |
| 2007/0239695 A1* | 10/2007 | Chakra et al. | 707/4 |
| 2008/0120383 A1 | 5/2008 | Kumar et al. | |
| 2009/0187852 A1 | 7/2009 | Tsuruta | |
| 2010/0228989 A1* | 9/2010 | Neystadt et al. | 713/185 |
| 2011/0066955 A1* | 3/2011 | Olson et al. | 715/752 |
| 2012/0271648 A1* | 10/2012 | Southard et al. | 705/2 |
| 2014/0195593 A1* | 7/2014 | Somerfield | G06F 17/24 709/203 |

OTHER PUBLICATIONS

"Software Listing: Secure Wap Mail", Retrieved at << http://www.sharewareconnection.com/titles/secure-wap-mail.htm >>, Mar. 24, 2003, 6 pages.

"Google Docs", Retrieved at << http://en.wikipedia.org/wiki/Google_Docs >>, Retrieved Date: Mar. 25, 2010, 5 pages.

"Gmail", Retrieved at << http://en.wikipedia.org/wiki/Gmail >>, Retrieved Date: May 7, 2010, 16 pages.

International Search Report and Written Opinion Received of the International Searching Authority for PCT Application No. PCT/US2011/034214, mailed on Dec. 7, 2011, 9 pages.

Search Report, Chinese Patent Application No. 201180022975.9, dated Jul. 3, 2013, 2 pages.

Search Report, European Patent Application No. 11777985.0, dated Jan. 22, 2014, 6 pages.

CN Decision on Rejection for Application No. 201180022975.9, Feb. 11, 2014.

* cited by examiner

STREAMLINED COLLABORATION ON DOCUMENT

BACKGROUND

Many documents are written collaboratively. People often collaborate on documents by e-mailing drafts of the document to each other. One person creates the initial document and e-mails it to the other collaborators. When a collaborator receives the document, the collaborator opens the document with the appropriate program (e.g., word processor, spreadsheet, etc.) and makes changes. That collaborator then re-attaches the revised document to an e-mail and sends it to the other collaborators. When other collaborators receive the revisions, they may make changes to the document and pass those changes on to others in a like manner. This process is unwieldy, because it involves several distinct actions to open and edit an e-mail attachment, and to reattach the edited version to another e-mail.

Some on-line services have begun to offer on-line document storage and editing. Such services provide users with a document repository that may be used to store documents. These services often provide browser-based document-processing software, such as word processors, spreadsheets, Portable Document Format (PDF) readers, etc., that run in browsers. Users can view and edit the documents in the browser using the browser-based software, and can save changes to the documents to the document repository.

However, there are certain aspects to on-line document services that can make these services cumbersome to use for collaboration. The process of opening and editing an e-mailed document, and then replying to the e-mail with changes, can be awkward in these systems. Additionally, the access control systems in on-line document services make it difficult to create a document that is accessible to the recipients of an e-mail, but not to the public at large.

SUMMARY

An online system that provides e-mail and document editing may streamline the process of collaborating on documents. In order for several people to collaborate on a document, a person creates the initial version of the document and e-mails it to other collaborators. When one of the collaborators reads the e-mail and opens the document, that recipient of the e-mail is taken to a copy of the document that is stored in the on-line system's document repository. The recipient may then edit the document. When the recipient closes the document, he or she is taken to a reply screen, which allows him or her to send a reply e-mail to the other people who received the document. In this way, the process of opening a document, editing it, and passing it along to other collaborators is integrated into a unified process.

The online system may provide a system of access control, in which access to a document can be restricted to those users who have appropriate permission. The system may streamline the process of setting the appropriate permissions on a document by giving access to the sender of the e-mail and to all recipients. In one example, the online system may limit permissions to registered users of the online system. Thus, the online system may grant permission to those people mentioned in the e-mail who are registered users, and may attempt to register those people who are not already registered users.

When the document is initially created, the creator may put the document into the online document repository, in which case the recipients of the e-mail receive a link to the online version of the document. In another example, the initial version of the document is not in the online document repository, but rather is attached to the e-mail. In this case, if one of the recipients uses the online e-mail and document system to open the document, the system may import the attachment into the document system (while giving other people listed on the e-mail permission to edit the document) and may give the recipient the online version to edit. At this point, the document is now in the online document system, so closing the document may cause the recipient to be taken to a reply mail screen, allowing that recipient to forward the changed document to the other collaborators.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
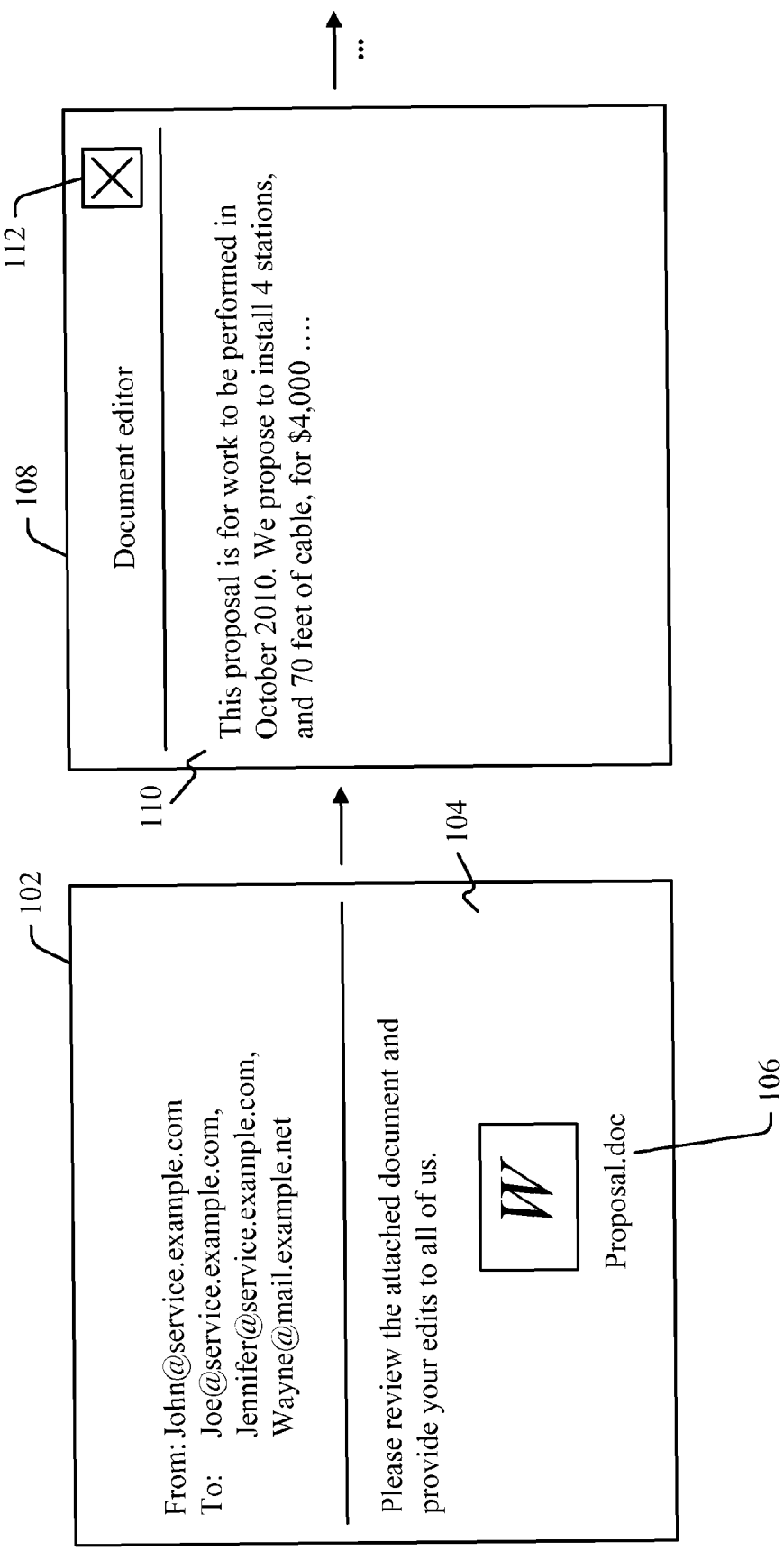
FIGS. 1 and 2 are block diagrams of an example work flow in which a user may collaborate on a document by e-mail.

In many situations, people collaborate on documents. Several people may work together to write a business document, a journal article, a chapter of a book, a technical drawing, a spreadsheet containing the guest list for a party, or any other type of document. Typically, one person creates the initial draft of the document and e-mails it to the other collaborators. One of the other collaborators makes changes and e-mails his or her changes to all of the other collaborators. When another collaborator receives the e-mail and edits the document, he or she may pass the document along by e-mail in the same way. However, this process is awkward. In order for people to collaborate on documents in this way, a person receives the documents as an e-mail attachment and opens the document. When that person is finished editing the document, he or she saves the document, creates an e-mail message, and manually attaches the changed document to the e-mail. Other recipients of the document do likewise.

Various online document editing systems now exist. For example, some services that provide web-based e-mail accounts also provide a suite of browser-based document editing programs and a document repository. These components allow a person to store documents online in the document repository, and to edit the documents inside a browser that executes on the person's computing device or other kind of device. However, these systems do not streamline the process of collaborating on a document by e-mail. If a user edits a document and wants to pass the edited document along to other collaborators, the user generally has to create an e-mail and attach the document as described above.

Moreover, while online document systems may support some form of access control, they generally do not support the scenarios that are relevant when people use e-mail to collaborate on documents. Online document systems generally allow documents to be made public, or may allow certain specific kinds of controls on who can use the document. But when people use e-mail to collaborate on a document, it is normally their intention to allow all recipients of the e-mail to read and edit the document. The access control systems of online document systems generally do not support this scenario.

The subject matter described herein may be used to facilitate collaboration on documents by e-mail. The subject matter herein may streamline the process of editing a document and passing it along to other collaborators by automatically generating the appropriate reply e-mail when the document-editing application is closed. Moreover, appropriate permissions may be associated with the document, so that recipients of the e-mail can access the document, while other people may be restricted from accessing the document.

In order for people to collaborate on a document, one person creates the initial version of the document, and e-mails the document to the collaborators. In one example, the document is created and stored in the repository of an online document system, so that the e-mail contains a link to the document in that repository. If the document is stored in a document repository, appropriate permissions are set so that the creator of the document, and anyone on the e-mail distribution list, can read and edit the document.

When a person receives the e-mail, that person uses the link in the e-mail to open the document in the document repository. The recipient's ability to access the document may be conditioned on the user presenting appropriate credentials. For example, the user may be registered with the service that provides the online document repository, and the service may allow the user to view and/or edit the document only upon signing in with a user-id and password. At the time that the user registered for the service, the user may be assigned an e-mail address with the service and also may have provided another one of his e-mail addresses to the service. Thus, the service can determine which user has permission to read the document by comparing the e-mail addresses on the distribution list with the known e-mail addresses of registered users. If the system cannot identify any user associated with the e-mail address, then the system may conclude that the e-mail address does not belong to a currently-registered user, and may ask a recipient of the e-mail to register for an account before allowing that user to open the document.

When the user opens the document (e.g., either using an existing account, or by signing up for a new account), the user may choose to edit the document. When the user closes the document, the user is presented with an appropriate user interface to send a reply message containing a link to the edited document. (The "reply" may be a "reply to all," which sends the reply to all people on the distribution list of the original e-mail that the user received.) Since closing the document may bring the user to the appropriate reply interface without the user having to engage in a separate event to create an e-mail, the process of receiving a document by e-mail and replying with changes is streamlined.

In the above example scenario, the document is initially created in an online document repository. However, the techniques described herein may be used even when the document is sent as an attachment to e-mail. When the document is received by a user who uses an online e-mail and document service, then, upon receipt of the e-mail, the document may be imported into the document repository of that service. The importation may take place automatically. At the time of the import, appropriate permissions may be set on the document to allow reading and writing of the document by the people on the e-mail distribution list. Once the document has been imported, people may edit the copy of the document in the repository. When a person closes the editing application, an interface to generate a reply e-mail is displayed, and the reply e-mail contains a link to repository copy of the document. Thus, even if the document did not start out in the online document service, at some point it may be imported into that service, at which point future recipients of the document may receive a link to the repository copy of the document.

Using the techniques described herein, the process of receiving a document by e-mail, editing the document, and passing the document along to another collaborator for further review and editing may be simplified.

Figure 2:
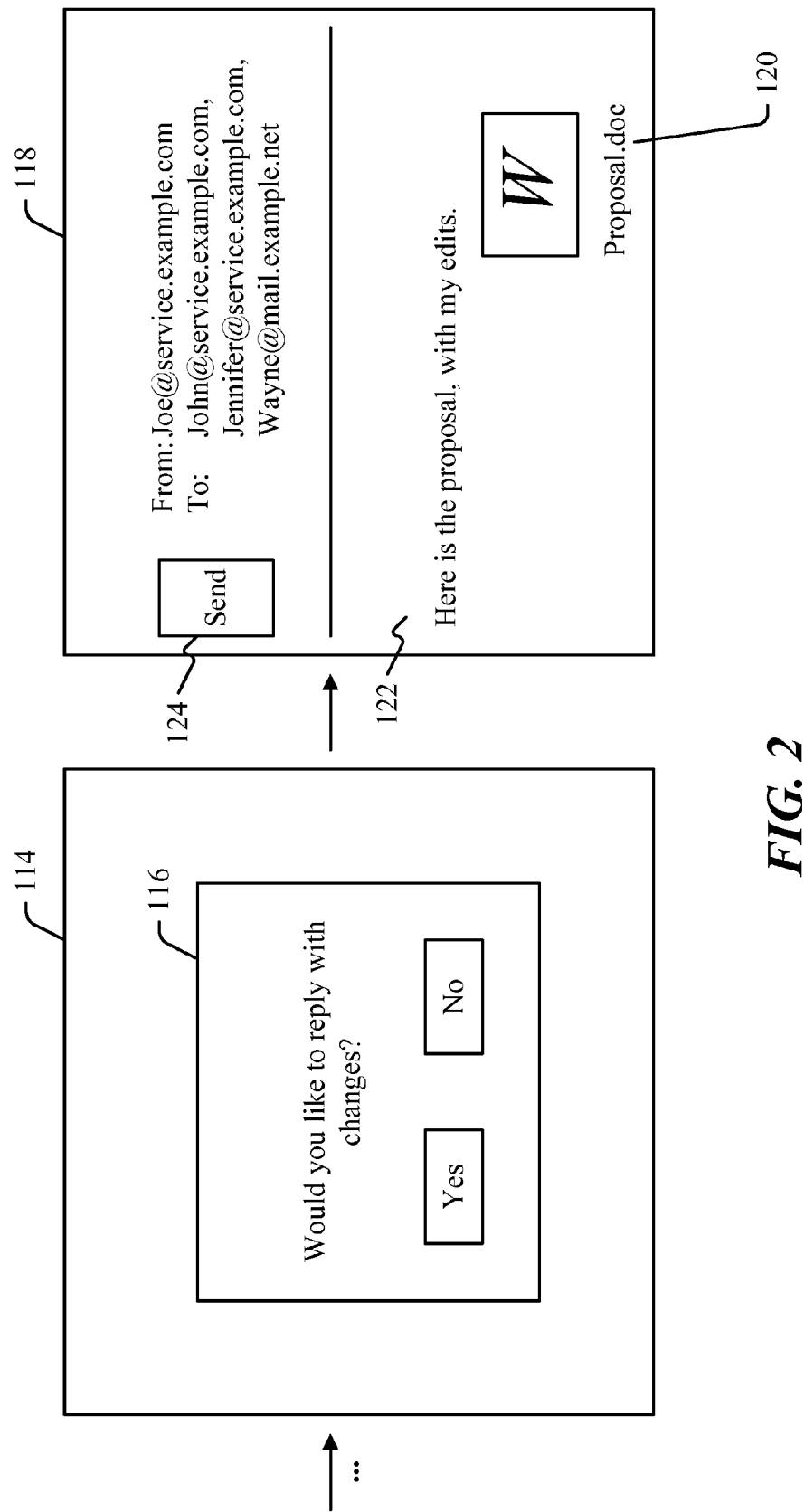

Turning now to the drawings, FIGS. 1 and 2 show an example work flow in which a user may collaborate on a document by e-mail. Each of the blocks in FIGS. 1 and 2 represents an example screen that may be shown to a user. Block 102 represents the view of an e-mail. In the example shown, the e-mail in block 102 is from the sender named "John," whose e-mail address is "john@service.example.com". The "service.example.com" domain may be the domain name of a service that provides both e-mail and document storage/editing facilities. The WINDOWS LIVE service is an example of such a service, since that service provides e-mail through the HOTMAIL mail service, and provides document storage/editing facilities through the MICROSOFT OFFICE LIVE WORKSPACE and WINDOWS LIVE SKYDRIVE services. However, the subject matter herein is not limited to Microsoft-branded services. Any entity may provide e-mail and/or document services, and the subject matter herein applies to any such service. In the example shown, John has created a document and has e-mailed the document to his collaborators for review and editing. The collaborators are the recipients of the e-mail.

The recipients of the e-mail shown in block 102 are "joe@service.example.com", "jennifer@service.example.com", and "wayne@mail.example.net". It will be observed that Joe and Jennifer are registered users of "service.example.com", and thus have e-mail accounts on that domain. Wayne's e-mail address, however, is not an e-mail address provided by that service (although, as discussed below, it may be the case that Wayne also has an e-mail on "service.example.com" that can be looked up using the e-mail address for Wayne that is shown in the figure.)

The e-mail contains text 104, and document 106. Text 104 requests that the recipients review and edit document 106. Document 106, in this example, is a word processing document, which may be editable with standalone desktop word processing applications, such as the MICROSOFT WORD application, or the OpenOffice.org writer application. Document 106 may also be editable with on-line, browser-based word processors, such as the MICROSOFT OFFICE LIVE WORKSPACE service's version of the MICROSOFT WORD application.

Document 106 may be included as an attachment to the e-mail. Or, document 106 may be in the e-mail in the sense that the e-mail contains a link to an online location of the document. For example, if the e-mail contains a link to a document stored in the WINDOWS LIVE SKYDRIVE service, then the e-mail can be said to contain document 106 in the sense that the e-mail points to that document.

In the remaining discussion of FIGS. 1 and 2, it will be assumed that Joe has received the e-mail shown in block 102, and that the various user interfaces shown in these figures are being shown to Joe.

At some point after receiving the e-mail of block 102, Joe clicks on document 106 to open the document with a word processor. Block 108 shows an example editing screen of the word processor. The word processor may be a browser-based word processor such as the MICROSOFT OFFICE LIVE WORKSPACE service's version of the MICROSOFT WORD application. However, the word processor could be a desktop application such as the desktop version of the MICROSOFT WORD application. (Commonly, people use an online word processor to edit documents that are stored in an online document repository (which may be remotely connected, through a network, to the device on which the document is being accessed). However, a desktop word processing application could be configured to interface with a document repository so that a user could use a desktop word processor to edit documents stored in the repository.) The word processor is an example of a document editor. While the example of FIGS. 1 and 2 refer to a word processing document, the document could be any type of document such as a spreadsheet, presentation, image, etc., in which case the document editor would be the spreadsheet program, presentation program, image editing program, etc.

Returning, however, to the example in which the document editor is a word processor, the recipient of the e-mail may use the word processor to edit the document. FIG. 1 shows some example text 110 in the document, and the user may use the word processor to make changes to that text and/or to comment on the text. When the user is finished editing, the user may click the close button 112 to close the document and/or word processor.

When the user clicks the close button, the user may be presented with a user interface such as that represented by block 114. That user interface contains a dialog box 116, which asks the user if he or she wants to reply to the original e-mail with the changes made to the document. The user can respond by clicking the "yes" or "no" buttons in the dialog box. The dialog block shown in FIG. 2 is one way of asking the user if he or she would like to reply to the e-mail with the changes made to the document, although the user could be asked in any manner.

If the user determines to reply with changes, the user may be presented with a draft reply e-mail (which is distinct from the original e-mail in the sense of being a separate mail item), addressed to the sender(s) and recipient(s) of the original e-mail that the user received. Block 118 represents an example of such an e-mail. Since, in this example, Joe is the person who made the edits, the e-mail indicates that it is from Joe, and that it is addressed to John, Jennifer, and Wayne (all of whom were either a sender or a recipient of the e-mail shown in block 102). The e-mail contains the edited document 120, which may be added to the e-mail automatically when Joe chooses to reply with changes. Joe may also choose to add text 122, and may then click send button 124 to send the e-mail. It is noted that this reply e-mail, in the example shown in FIGS. 1 and 2, is created as part of the process of closing the document, rather than in response to an explicit request by the user to create an e-mail. Normally, e-mails are created when a user explicitly issues a text- or menu-based command to create an e-mail (e.g., a "new message command", a "reply to" command, etc.) In contrast, the reply e-mail described above is created without such an explicit command; rather the creation of the e-mail performed by a device as part of the process that occurs when the user requests to close the document. (The creation of the e-mail without any explicit command from the user may include the act of asking the user if he or she wants to reply to the original e-mail with changes, as shown in block 114.)

When other collaborators receive Joe's e-mail, they may open the online copy of the document that Joe has edited, and may add their own changes and/or comments. As discussed above, that document may have permissions set so that any person on the distribution list of the e-mail (anyone who is either a sender or a recipient) may read and edit the document.

Figure 3:
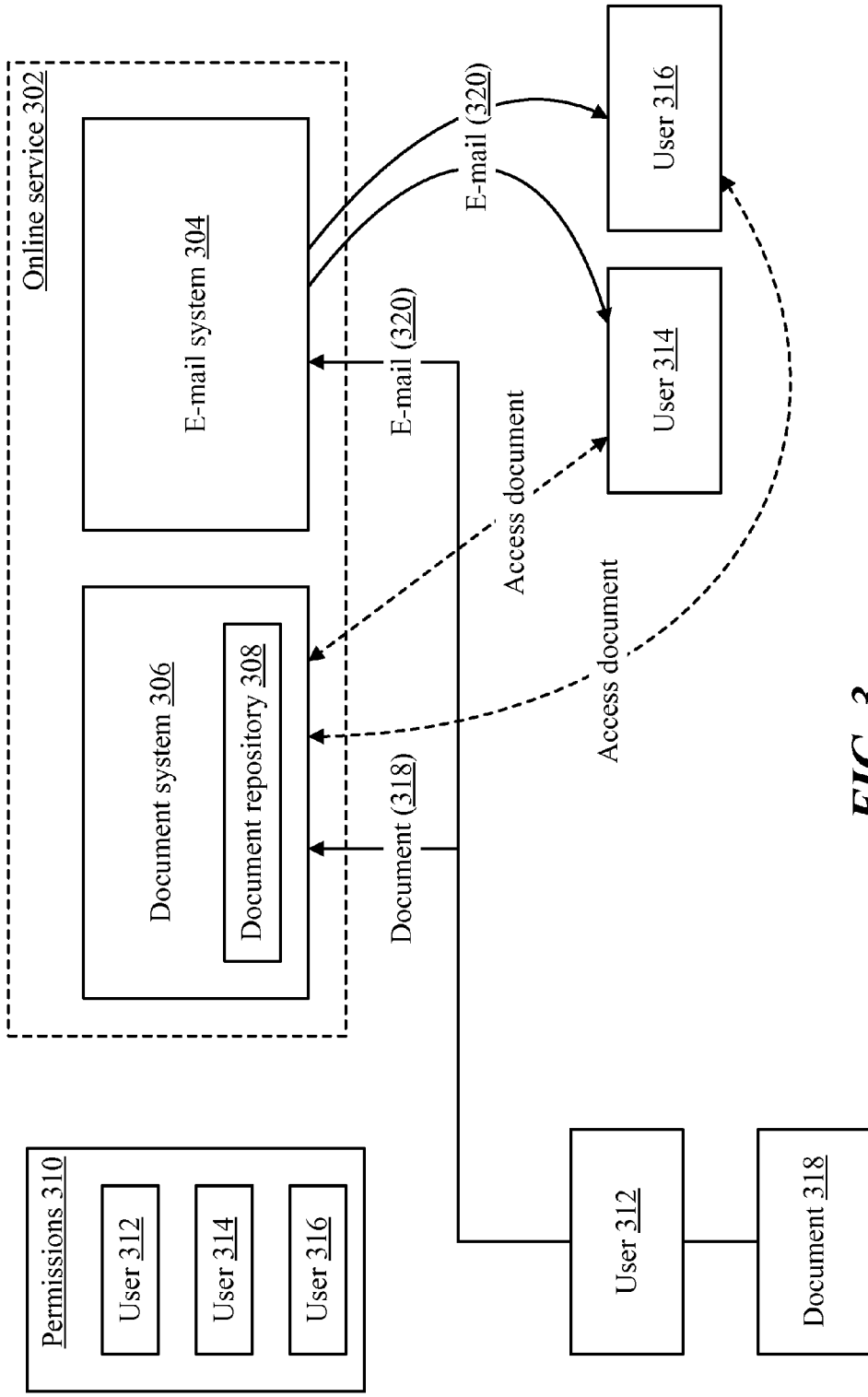
FIG. 3 is a block diagram of an example system in which users may collaborate on a document by e-mail.

FIG. 3 shows an example system in which users may collaborate on a document by e-mail. Online service 302 is a service that provides both e-mail and document management. To this end, online service 302 comprises an e-mail system 304 and a document system 306. E-mail system 304 may, for example, be a webmail system in which users can obtain an e-mail address and can send and receive e-mails through a web interface. Document system 306 comprises a document repository 308 in which documents may be stored. Additionally, document system 306 may provide online applications to edit documents, such as the online word processor described above. While FIG. 3 shows an example in which document system 306 and e-mail system 304 are part of the same underlying online service, these two systems could be part of different services. That is, there could be two services, one of which provides e-mail and the other of which provides storage and/or editing of documents. The techniques described herein may be used regardless of whether e-mail system 304 and document system 306 are part of the same service.

Documents stored in document repository 308 may be associated with various types of permissions 310. In one example, the permissions 310 state that the document is public and can be opened and/or edited by anyone. In another example, permissions 310 list specific users (e.g., users 312, 314, and 316) who may read and/or edit a given document. The particular users who may read the document may be identified by their e-mail address within online service 302. That is, if online service 302 assigns e-mail addresses of the form "user@service.example.com", then this e-mail address may, in effect, act as the user's account identifier within online service 302. Thus, the users in whose favor permissions 310 run may be identified by this e-mail address.

In the example of FIG. 3, user 312 creates a document 318, and wants to collaborate on document 318 with two other users 314 and 316. Thus, user 312 stores document 318 in the document repository 308 of document system 306, and uses e-mail system 304 to send e-mail 320 to users 314 and 316. E-mail 320 may ask users 314 and 316 to collaborate on document 318 by providing their changes and/or comments. In the example of FIG. 3, user 312 is a user of online service 302 and chooses to create and store document 318 in document system 306. However, it might also be the case that user 312 is not a user of online service 302, or is a user of that service but chooses not to use that service to create the document and/or to send the e-mail. In that case, user 312 might use a different e-mail system to send document 318 as an attachment, in which case document 318 could be imported into document system 306 when a user who does use that system tries to open the document.

Assuming that document 318 is already in document system 306, when a user (such as user 314) opens e-mail 320, that user will see document 318 mentioned in the e-mail, and will access the document. For example, e-mail 320 may contain a link to a copy of document 318 that exists in document repository 308, and user 314 may click that link to open the document. From that point, user 314 may edit the document. When user 314 closes the document, user 314 may be presented with a user interface offering the user the opportunity to reply to the other collaborators with the changes that user 314 has made. It is noted that, as a document is changed by the collaborators, the successive versions of the document may be stored. In this way, collaboration on a document using the techniques provided herein may, as a consequence, provide versioning of the document. Prior versions may be accessed, thereby allowing the collaborators to revert to a particular iteration of the revisions (i.e., to a particular version of the document undergoing revision).

Figure 4:
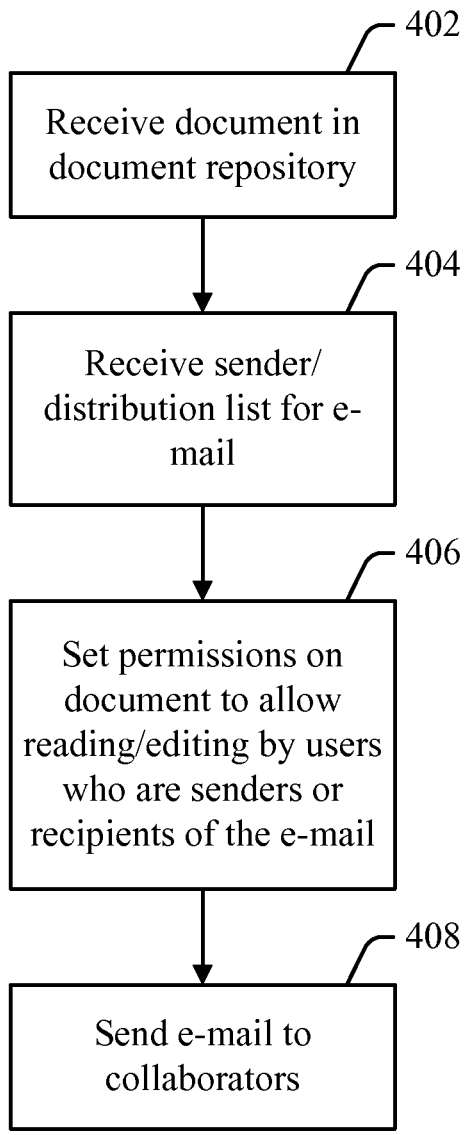
FIG. 4 is a flow diagram of an example process in which a document may be received in document system in order to allow collaboration by e-mail.
Figure 5:
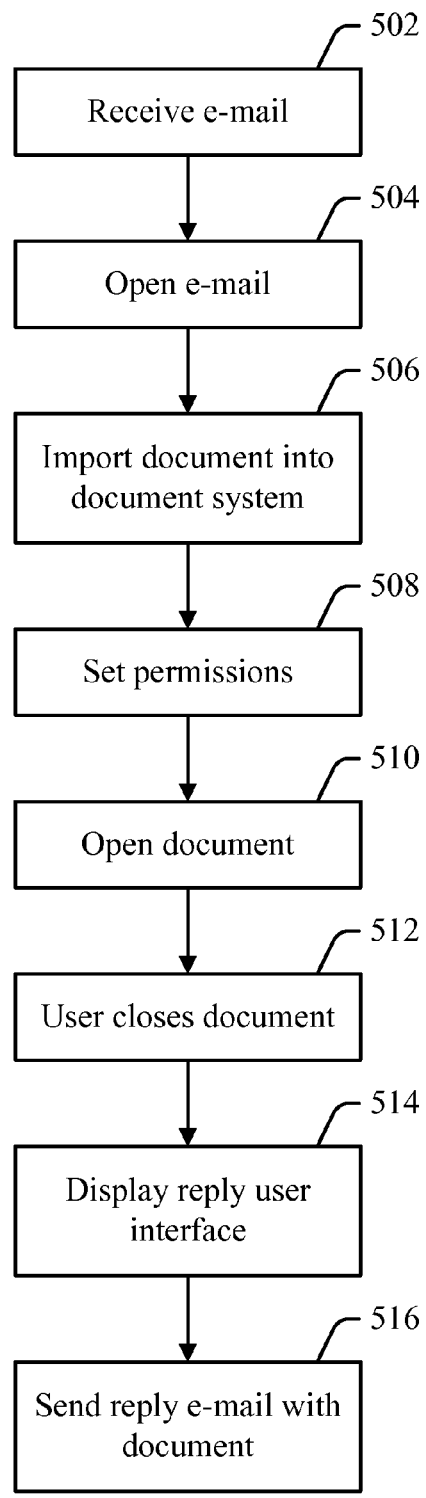
FIG. 5 is a flow diagram of an example process that may be carried out by a person who collaborates on a document by e-mail.

FIG. 4 shows an example process in which a document may be received in document system in order to allow collaboration by e-mail. Before turning to a description of FIG. 4, it is noted that the flow diagrams contained herein (both in FIG. 4 and in FIG. 5) are described, by way of example, with reference to components shown in FIGS. 1-3, although these processes may be carried out in any system and are not limited to the scenarios shown in FIGS. 1-3. Additionally, each of the flow diagrams in FIGS. 4 and 5 shows an example in which stages of a process are carried out in a particular order, as indicated by the lines connecting the blocks, but the various stages shown in these diagrams can be performed in any order, or in any combination or sub-combination.

At 402, a document may be received into a document repository. For example, the document may be received into the repository when the document is created by its initial creator. Or, as another example, the document may be imported into the repository when an e-mail attaching the document is received by someone who uses the online service of which the document repository is a part.

At 404, the sender/distribution list for an e-mail is received. This list may include the sender and recipient(s) of an e-mail. The list may be received when the initial creator of a document creates the e-mail to send the document to other collaborators. Or, the list may be received when a previously-created e-mail that attaches the document is received by one of the collaborators who uses an online document service.

At 406, permissions on the document are set to allow reading and editing of the document by users who are senders or recipients of the e-mail. As described above, setting the permissions in this manner streamlines the process of allowing collaborators to edit a document. In one example, the setting of permissions occurs by a computer (under control of a program) giving permission to all users on said distribution list, and not by a user specifying which users are to receive permission. In addition to granting read and edit permission to all users on an e-mail distribution list, a token could also be created that allows other users to access the document. When a document is stored in the repository, a link to the document may be created in the form of, for example, a Uniform Resource Locator (URL). A token (e.g., a alpha-numeric string) may be embedded in the URL that allows anyone with the correct URL to access the document. Thus, if the link to the document is forwarded to someone outside of the distribution list, that person may be able to access the document using the token contained in the link. In one example, token-based access to the document is read-only, in order to prevent editing of the document by people outside of the distribution list. Additionally, a document for which token-based access is allowed can be made non-public, so that it cannot be discovered through a search by people who do not have the tokenized link. However, in another example, the token could grant both read and edit permission, and/or the document could be made public.

At 408, an e-mail with the document may be send to collaborators. The e-mail may, for example, contain a link to the document in the document repository.

FIG. 5 shows an example process that may be carried out by a person who collaborates on a document by e-mail.

At 502, the collaborator receives an e-mail. At 504, the collaborator opens the e-mail. If the e-mail contains a document that is attached to the e-mail (rather than containing a document that has already been imported into a document system), then at 506 the document is imported into the document system, and at 508 the permissions on the document are set to allow the sender and recipient(s) of the e-mail to read and edit the document. (If the document is already imported into the document system, then stages 506 and 508 may be omitted.)

At 510, the document may be opened—e.g., a user may click on a link to the document in order to open the document using a browser-based document editor. The user may then make comments on or edits to the document. When the user is finished commenting on and/or editing the document, the user may close the document at 512. When the document is closed, a user interface may be displayed, asking the user if the user wants to reply to the other collaborators with the changes/comments that the user has made. (It is noted that the act of displaying an interface may be performed by a server or by a client. For example, a server may send, to a client machine, instructions and/or data that cause the client machine to display a user interface. In that example, the act of "displaying" the interface may be understood as having been performed by the server.) If the user decides to reply, then, at 514, an interface may be displayed to the user with a draft e-mail to the other collaborators (e.g., those people who were on either the sender or recipient list of the e-mail that the user previously received containing the document). At 516, the user may then send the e-mail to the other collaborators, who may then open and edit the document in the manner described above.

Figure 6:
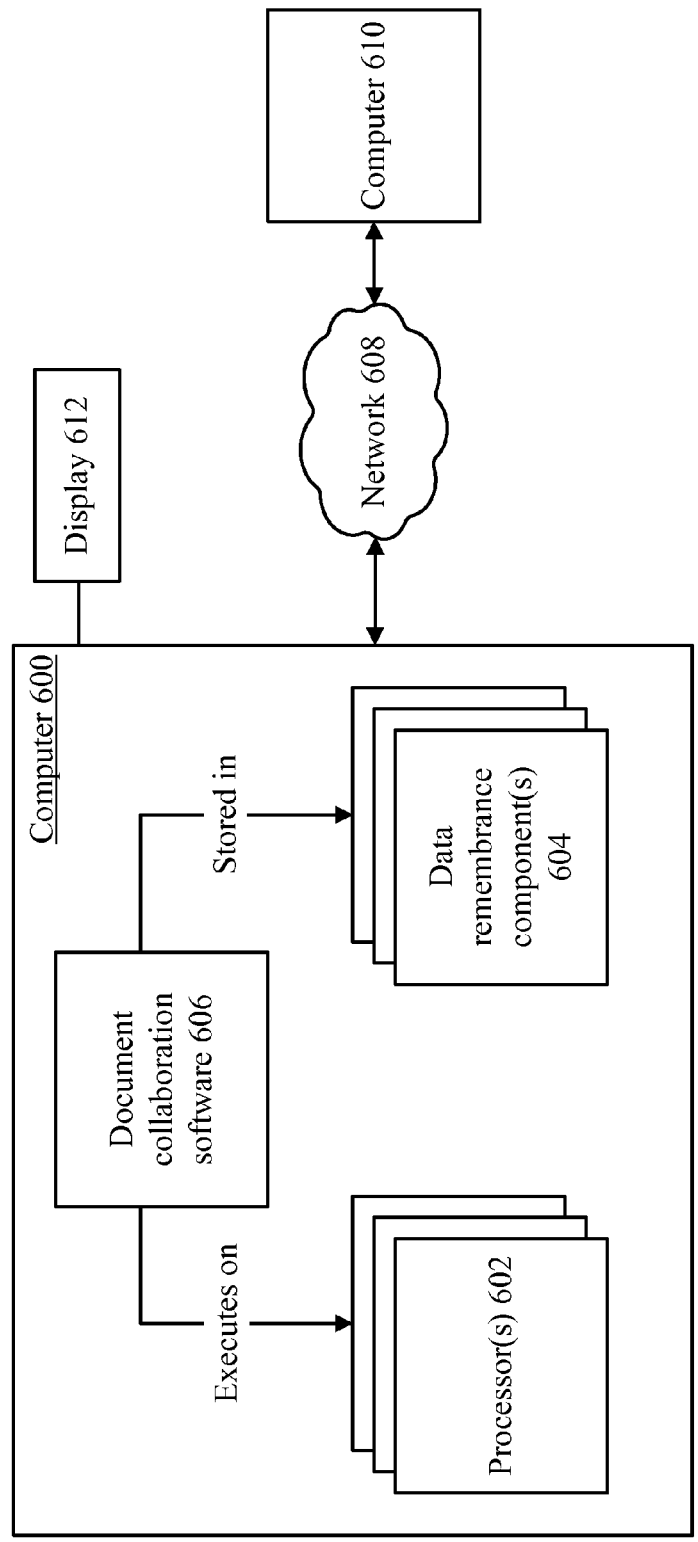
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is document collaboration software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 600 may be communicatively connected to one or more other devices through network 608. Computer 610, which may be similar in structure to computer 600, is an example of a device that can be connected to computer 600, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method performed on a client computing device, the method comprising:
   receiving, by the client computing device from an on-line e-mail system, an e-mail that includes an attached document, where the received e-mail indicates a sender of the received e-mail and at least one recipient of the e-mail;
   opening, by the client computing device in response to a request by a user, the e-mail, where the user is one of the at least one recipients;
   presenting, by the client computing device from an on-line document system in response to the attached document being selected, an on-line version of the attached document, and where permissions were set on the on-line version in the on-line document system sufficient to allow reading and editing of the on-line version by the sender and by the at least one recipient;
   displaying, by the computing device in response to the presented online version being closed, a user interface asking the user if the user wants to send a reply to the received email with any changes made by the user to the presented online version; and
   sending, by the client computing device subsequent to the user indicating in the displayed user interface that the user wants to send the reply, the reply to the received e-mail, where the reply includes a link to the on-line version with the any changes.

2. The method of claim 1, where the on-line e-mail system and the on-line document system are separate systems.

3. The method of claim 1, where the on-line version is edited via a browser-based document editor provided by the on-line document system.

4. The method of claim 1, where the on-line document system limits access to on-line versions of the attached document to users who have permission to access the on-line versions of the attached document.

5. The method of claim 1, where versioning of the attached document is provided based on on-line versions being stored by the on-line document system.

6. The method of claim 1, where the on-line e-mail system and the on-line document system are grouped in an on-line service.

7. The method of claim 1, where the attached document is a word processing document, a spreadsheet, or a presentation.

8. At least one computer-readable hardware device comprising:
   memory comprising executable instructions that, based on execution by a client computing device, configure the client computing device to:
   receive from an on-line e-mail system, an e-mail that includes an attached document, where the received e-mail indicates a sender of the received e-mail and at least one recipient of the e-mail;
   open, in response to a request by a user, the e-mail, where the user is one of the at least one recipients;
   present, in response to the attached document being selected, an on-line version of the attached document, and where permissions were set on the on-line version in the on-line document system sufficient to allow reading and editing of the on-line version by the sender and by the at least one recipient;
   display, in response to the presented online version being closed, a user interface asking the user if the user wants to send a reply to the received email with any changes made by the user to the presented online version; and
   send, subsequent to the user indicating in the displayed user interface that the user wants to send the reply, the reply to the received e-mail, where the reply includes a link to the edited on-line version with the any changes.

9. The at least one computer-readable hardware device of claim 8, where the on-line e-mail system and the on-line document system are separate systems.

10. The at least one computer-readable hardware device of claim 8, where the on-line version is edited via a browser-based document editor provided by the on-line document system.

11. The at least one computer-readable hardware device of claim 8, where the on-line document system limits access to on-line versions of the attached document to users who have permission to access the on-line versions of the attached document.

12. The at least one computer-readable hardware device of claim 8, where versioning of the attached document is provided based on on-line versions being stored by the on-line document system, or where the attached document is a word processing document, a spreadsheet, or a presentation.

13. The at least one computer-readable hardware device of claim 8, where the on-line e-mail system and the on-line document system are grouped in an on-line service.

14. A system comprising:
   a client computing device that includes at least one processor and memory;
   a first component of the client computing device configured to receive, from an on-line e-mail system, an e-mail that includes an attached document, where the received e-mail indicates a sender of the received e-mail and at least one recipient of the e-mail;

a second component of the client computing device configured to open, in response to a request by a user, the e-mail, where the user is one of the at least one recipients;

a third component of the client computing device configured to present, in response to the attached document being selected, an on-line version of the attached document, where permissions were set on the on-line version in the on-line document system sufficient to allow reading and editing of the on-line version by the sender and by the at least one recipient;

a fifth component of the client computing device configured to display, in response to the presented online version being closed, a user interface asking the user if the user wants to send a reply to the received email with any changes made by the user to the presented online version; and a fourth component of the client computing device configured to send, subsequent to the user indicating in the displayed user interface that the user wants to send the reply, the reply to the received e-mail, where the reply includes a link to the edited on-line version with the any changes.

15. The system of claim 14, where the on-line e-mail system and the on-line document system are separate systems.

16. The system of claim 14, where the on-line version is edited via a browser-based document editor provided by the on-line document system.

17. The system of claim 14, where the on-line document system limits access to on-line versions of the attached document to users who have permission to access the on-line versions of the attached document.

18. The system of claim 14, where versioning of the attached document is provided based on on-line versions being stored by the on-line document system.

19. The system of claim 14, where the on-line e-mail system and the on-line document system are grouped in an on-line service.

20. The system of claim 19, where the attached document is a word processing document, a spreadsheet, or a presentation.

* * * * *